June 22, 1965   E. TUROWSKI   3,190,229
METHOD AND APPARATUS FOR CONVEYING LIQUIDS
Filed June 7, 1962   2 Sheets-Sheet 2

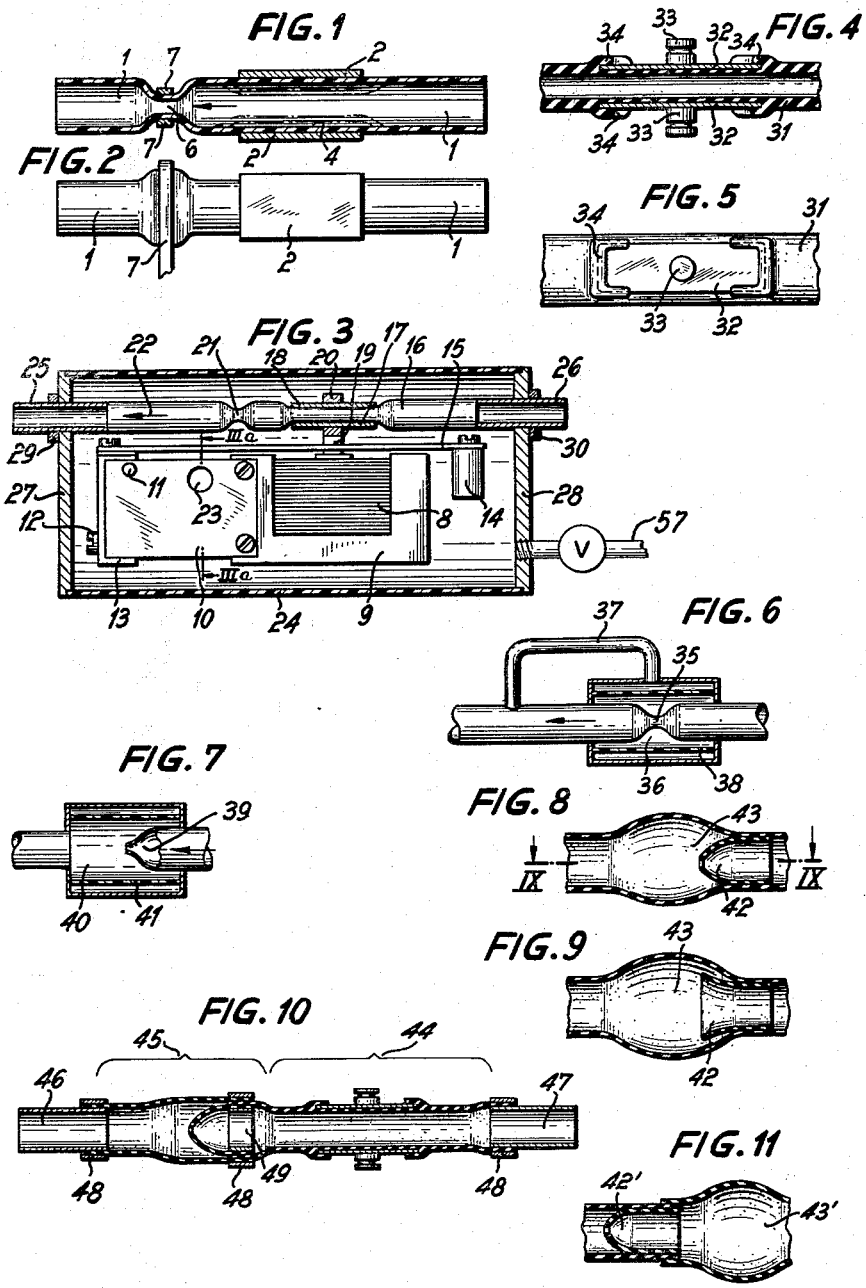

INVENTOR.
ERWIN TUROWSKI
BY
McGlew & Toren
ATTORNEYS

3,190,229
METHOD AND APPARATUS FOR CONVEYING LIQUIDS
Erwin Turowski, Forststrasse 40, Berlin-Zehlendorf, Germany
Filed June 7, 1962, Ser. No. 200,866
Claims priority, application Germany, June 9, 1961, T 20,271; Nov. 10, 1961, T 21,093
8 Claims. (Cl. 103—148)

The present invention relates to a method and an apparatus for conveying a liquid or gaseous medium through a pipe line.

By hydraulic experiments the discovery has been made that a liquid or gaseous medium may be conveyed through a pipe line if a pulsating pressure is exerted upon the medium, for example, by a periodic contraction of the cross-sectional area of an elastic part of the pipe line, and if downstream of the periodically contracted point, as seen in the direction of the desired flow, an elastic constriction is provided in the line, for example, in the form of a nozzle. The unidirectional flow of the medium which is attained by the periodically successive impulses is due to the fact that the nozzle-like constriction is widened by the overpressure of the medium which occurs during each impulse and is contracted or closed by the underpressure which occurs during the interval between the successive impulses. Thus, as the result of this pressure-responsive resistance, a rectifying effect is exerted by this constriction.

A further object of the invention is to provide an apparatus in the form of a pumplike mechanism for carrying out the above-mentioned new conveying method.

The features and advantages of the present invention will become more clearly apparent from the following detailed description thereof which is to be read with reference to the accompanying drawings, in which:

FIGURE 1 shows a longitudinal section of a part of the apparatus according to the invention;

FIGURE 2 shows a plan view of the part of the apparatus according to FIGURE 1;

FIGURE 3 shows in a longitudinal section a diagrammatic illustration of an entire apparatus according to the invention;

FIGURE 4 shows a longitudinal section of a modification of a part of the apparatus according to FIGURE 3;

FIGURE 5 shows a plan view of the part according to FIGURE 4;

FIGURE 6 shows a diagrammatic longitudinal section of another modification of a part of the apparatus according to FIGURE 3;

FIGURE 7 shows a diagrammatic longitudinal section of a further modification of the part according to FIGURE 6;

FIGURE 8 shows a longitudinal section of another modification of the part according to FIGURES 6 and 7;

FIGURE 9 shows a section taken along line IX—IX of FIGURE 8;

FIGURE 10 shows a longitudinal section of an assembly of the parts of the apparatus according to FIGURES 4 and 5 together with those according to FIGURES 8 and 9;

FIG. 11 shows a longitudinal section of a further modification of the part of the apparatus according to FIGURE 8;

Figure 12:
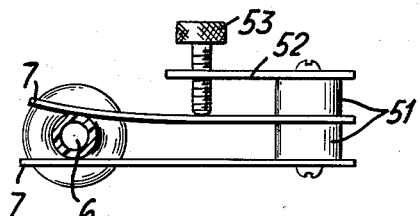
FIG. 12 is a transverse sectional view illustrating means for adjusting the pressure on a contractible portion of a pipeline.
Figure 13:
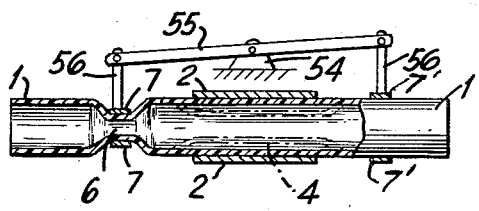
FIG. 13 is a longitudinal sectional view illustrating a modification of the arrangement shown in FIG. 1.

Referring to the drawings, FIGURES 1 and 2 show the principal part of the new appratus, namely, an elastic tube 1 which is to be connected to a pipe line and may be of any desired cross-sectional shape. The section 4 of this elastic tube may be periodically contracted by being mechanically compressed by one or two plates 2. Downstream from this section 4, as seen in the line of flow, for example, of a liquid, as indicated by an arrow in FIGURE 1, the elastic tube 1 is provided with an elastic construction 6 which in this particular embodiment of the invention is produced by springs or resilient arms 7. The force of springs 7 may be adjusted, as illustrated in FIG. 12, by mounting the fixed ends of springs in a fixed block 51 from which there extends an arm 52 through which is threaded an adjusting screw 53 bearing upon the upper spring 7. This constriction may, however, instead consist of an elastic part which is molded to the desired shape and may only be additionally provided with the springs 7 if required. The periodic pressure impulses in the elastic tube 1 may be produced by reciprocating the plates 2 relative to each other by means of a motor and eccentrics or by a vibrator magnet which is supplied with alternating current or intermittent direct current. In order to permit the direction of flow also to be reversed, two constrictions 6, either of which may be rendered inactive when desired by being expanded, may be provided at the opposite ends of the contractible section 4. Such an arrangement is illustrated in FIG. 13, wherein a beam or lever 55 is pivotally mounted, intermediatte its ends, upon a fixed pivot 54. Rods or the like 56 are articulated to the opposite ends of lever 55, and each rod 56 is connected to a spring 7 or 7', whereby the springs 7, 7' on either side of the section 4, may be compressed alternately to compress the engaged portion of the tube.

If the impulses are produced as indicated in FIGURE 1 by plates 2 which are merely layed upon the elastic section 4 and therefore only act in the direction of the contraction, the efficiency of the pumplike apparatus will not be very high since the required expansion of the contracted section to its original shape is then dependent entirely upon its own elasticity. In order to attain a positive mechanical expansion of the elastic section 4 independent of its own elasticity it is advisable to secure the walls of the latter positively to the plates 2 so that during their mechanical return movement these plates will draw the walls of section 4 apart.

It is possibly the most simple and inexpensive manner of construction of the apparatus if the entire elastic tube 1 or the individual sections thereof are molded of rubber or similar elastic plastics. The positive connection between the walls of the alestic section 4 and the driving means may be attained by vulcanization or by means of an adhesive. Elastic tubes of such materials are also very suitable for conveying chemically corrosive media. It is then also possible to make the elastic tubes of several superimposed layers of different materials, the outer layer of which is especially suitable for being secured to the driving means, while the inner layer is especially adapted for conveying the respective corrosive medium.

The principles of the construction and operation of a pumplike apparatus according to the invention will now be described with reference to FIGURE 3 in which such an apparatus is illustrated diagrammatically.

A magnetic system which consists of an E-shaped iron yoke 9 and a field coil 8 which is supplied, for example, with alternating current carries a pair of mounting plates 10 (the rear of which is not visible in the drawing) on which a block 13, which is pivotally mounted on an axis 11, is adjustable by means of a setscrew 12. On this mounting block 13 an oscillating spring 15 is secured which, for controlling its resonance, is provided with a suitable weight 14 and may be adjusted by means of setscrew 12 to the most suitable distance from the poles of the magnet. The elastic tubular line section 16 carries the plates 17 and 18 which are secured thereto, for example, by an adhesive or by vulcanization. Plate 17 at the side of tube 16 facing the coil 8 is connected by an intermediate member 19 to spring 15, while the other plate 18 is connected to the iron yoke 9 by means of a bracket, not shown, which extends around the spring 15. At the left side of plates 17 and 18 on the elastic section 16, the tube is provided with an elastic constriction 21. When the electromagnet is energized either by an alternating current or by an intermittent direct current which may be chopped by a contact which is mounted on the oscillating spring 15, plates 17 and 18 will oscillate relative to each other with the results, as previously described, that a flow of the liquid to be conveyed occurs in the direction of the arrow 22. For adjusting the elastic construction 21 to its most suitable medium cross-sectional size, this section may be twisted about its axis or it may be done by means of springs 7, as indicated in FIGURE 1, the pressure of which upon the construction may be adjusted. In order to reduce the noise of the operation of the drive as much as possible, the entire driving system thereof is mounted at the axis of its oscillations, for example, by means of a metal screw or shaft 3, enclosed in a fiber or rubber sleeve 5 which is inserted through a metal bushing 50 engaged in bores 23 in the mounting plates 10 and is secured to the housing of the driving system.

This housing preferably consists of a round or rectangular pipe section 24, for example, of plastic. This permits a very simple installation of the device which is then surrounded by the pipe section 24 and elastically mounted therein by any suitable conventional means. Connecting pieces 25 and 26 which are secured to the ends of the elastic tube project through suitable bores in the end plates 27 and 28 which are secured to the two ends of the pipe section 24, for example, by being cemented or welded thereto. The connecting sockets or nipples 25 and 26 are preferably cemented or welded to the end plates 27 and 28 by means of rings 29 and 30.

If the electric cable, not shown, which leads to coil 8 is likewise passed through one of the end plates 27 or 28 by being tightly sealed thereto in any suitable manner, the pumplike device and its driving system will be tightly sealed by the housing toward the outside. Thereby gas pressure within the housing may be controlled by a valved nipple 57. The simple installation of the apparatus has the further advantage that it is fully protected from corrosion of any of its mechanical or electrical parts which are so completely sealed within the housing that the entire apparatus can even be immersed into a medium which is to be conveyed.

Figure 3A:
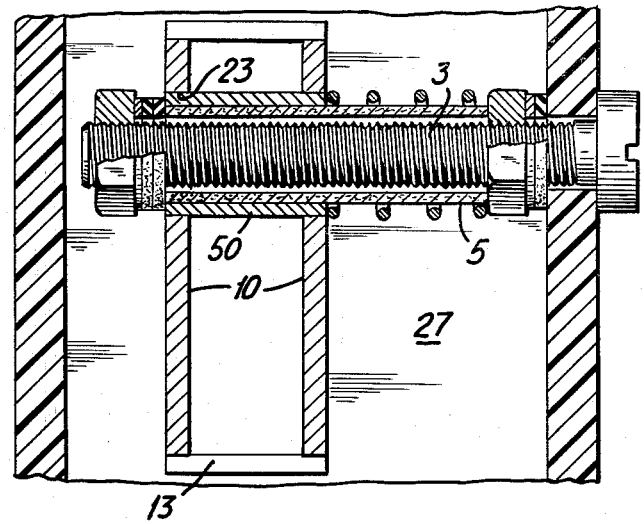
FIG. 3a is a sectional view taken on line IIIa—IIIa of FIG. 3.

Instead of employing an oscillating magnet as illustrated in FIGURE 3, it is also possible to reciprocate the two plates 17 and 18 by means of eccentrics or similar means which are driven by a motor. The pipe line section of the apparatus according to FIGURE 3 may be molded as one integral piece or it may consist of several parts which may be connected to each other by means of clamps and internal reinforcing rings or by cementing them to each other with an adhesive. The line section 16 and 22 may also be placed very closely adjacent to each other and the line portion between the section 16 and the connecting piece 26 may be made as short as possible or it may be made less elastic, for example, by inserting reinforcing rings therein, so that the periodic impulses which are produced within the section 16 will not be weakened by the elasticity of the walls of this line portion but will be fully effective at the constriction 21.

FIGURES 4 and 5 illustrate a modification of the line section 16 according to FIGURE 3. The elastic line section 31 and the two pressure plates 32 are combined into a single structural unit, for example, by being vulcanized together. Plates 32 which are provided with connecting pieces 33 are then preferably enclosed and gripped at their ends by reinforcements 34 on the elastic line 31 which insure that the parts will not become severed from each other in a continuous operation of the apparatus.

The efficiency of the pumplike apparatus as previously described depends upon the back pressure or pressure head insofar as the elastic constriction which is at first preset to the most effective cross-sectional size is widened in accordance with the increase in the internal pressure relative to the outside. The most efficient cross-sectional size of this constriction therefore changes to one less efficient. This effect may be compensated by springs which act upon the elastic constriction and are adjustable by hand, or by twisting the elastic constriction in the axial direction. According to FIGURE 6, such an elastic constriction 35 is for this purpose enclosed within a pressure chamber 36 which is, for example, a cylindrical shape and the internal pressure of which varies in response to the back pressure or pressure head, for example, through a branch line 37 which is connected to a discharging part of the line system. The effect is then produced, for example, by the elastic annular wall 38 of the pressure chamber 36, that the elastic constriction is surrounded within this annular wall by a gas cushion.

It is further advisable to employ an elastic constriction which is provided with a parabolic, centrally divided jacket. This constriction, as illustrated in FIGURE 7 in cross section therefore has the general shape of a lip valve 39 which is constricted in the direction of flow and terminates into a chamber 40. In order to attain the highest possible efficiency of operation, it is again necessary, as described with reference to the previous embodiment in which the elastic constriction is surrounded by air or gas, to provide that the surroundings of the lip valve will yield elastically so that the lip movements following the individual impulses will not be impeded. When employing a rigid chamber 40 according to FIGURE 7, a gas cushion will therefore be present in this chamber which may be separated from the liquid to be conveyed, for example, by an elastic annular wall 41.

It is, however, more simple to make the chamber itself of an elastic construction. This is preferably done by employing a molded part of an elastic material, such as rubber or a suitable plastic, a preferred embodiment of which is illustrated in FIGURES 8 and 9. The lip valve 42 is mounted within the molded part 43 which may be axially symmetrical, or of an oval cross section to attain a better resilient yieldingness. FIGURE 10 shows the line sections 44 and 45 which are attached to each other and may be employed in the pumplike apparatus as described with reference to FIGURE 3, but in place of the line sections as shown therein. The structural parts as illustrated in FIGURES 4 and 5 are indicated generally in FIGURE 10 at 44, while those according to FIGURES 8 and 9 are indicated generally in FIGURE 10 at 45. The two connecting pieces or nipples which pass through the housing covers to the outside are indicated at 46 and 47. The different parts may be cemented to each other by adhesive or be connected by clamps 48 which may also be reinforced by ring inserts 49. For attaining a pumping effect, it is immaterial in principle whether the line section 45 is located upstream of or downstream of the line section 44, as seen in the direction of flow. If the constriction in the form of a lip valve is located upstream of the line section 44, that is, at the right in FIGURE 10, the elastic chamber should consist of a molded part 43', as shown in FIGURE 11, which is disposed upstream of the lip valve 42'. The important feature is therefore that, regardless of the particular position of the lip valve 42 or 42', an elastically yielding volume of the medium to be conveyed is provided as closely as posssible to the lip valve.

If in addition to the single lip valve, as illustrated in FIGURE 10 at the left of the unit 44, a second lip valve which extends in the same direction is inserted, for example, at the connecting point between part 44 and the connecting piece 47, the pumplike apparatus according to the invention may also be employed for conveying gaseous substances, or when conveying liquids it will exert a suction effect.

The method according to the invention and a pumplike apparatus which is designed for conveying liquids in accordance with this method may also be employed as a drive for propelling watercraft. The features of such a drive are a pipe line which may have any desired cross-sectional shape but should be of a size in accordance with the flow of water therethrough as required within a certain unit of time, and which should be provided with an elastic, periodically compressible section and behind the latter with an elastically yielding constriction, the cross-sectional size of which is controlled by the pressure impulses.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A system for pumping fluid media comprising: a conduit for receiving the media to be pumped, said conduit including a first section of an elastic material and a second elastic material section which has a cross sectional flow area which is normally constricted relative to the cross sectional flow area of said first section; and means for repetitively applying force to said first section to reduce the flow area thereof to pressurize the fluid media and enable the pressurized media to expand the normally constricted flow area of said second section for flow of fluid media from said first section to said second section and through the expanded constricted flow area of the latter, said constricted flow area, upon release of the pressure on said first section, substantially inhibiting return flow of fluid media to said first section, said normally constricted flow area of said second section being produced by an adjustable force spring acting on said second section.

2. A system for pumping fluid media comprising: a conduit for receiving the media to be pumped, said conduit including a first section of an elastic material and a second elastic material section which has a cross sectional flow area which is normally constricted relative to the cross sectional flow area of said first section; and means for repetitively applying force to said first section to reduce the flow area thereof to pressurize the fluid media and enable the pressurized media to expand the normally constricted flow area of said second section for flow of fluid media from said first section to said second section and through the expanded constricted flow area of the latter, said constricted flow area, upon release of the pressure on said first section, substantially inhibiting return flow of fluid media to said first section, there being further included a gas filled chamber enclosing at least the constricted portion of said second section.

3. The system according to claim 2 wherein means are provided for regulating the gas pressure in said chamber, said regulating means comprising means for introducing back pressure derived from a discharging section of said conduit to act upon the outside of said chamber.

4. A system for pumping fluid media comprising: a conduit for receiving the media to be pumped, said conduit including a first section of an elastic material and a second elastic material section which has a cross sectional flow area which is normally constricted relative to the cross sectional flow area of said first section; and means for repetitively applying force to said first section to reduce the flow area thereof to pressurize the fluid media and enable the pressurized media to expand the normally constricted flow area of said second section for flow of fluid media from said first section to said second section and through the expanded constricted flow area of the latter, said constricted flow area, upon release of the pressure on said first section, substantially inhibiting return flow of fluid media to said first section, said constricted portion of said second section comprising a valve element within an elastically yieldable hollow body portion, said hollow body portion having a volume variable with pressure therein.

5. The system according to claim 4 wherein said valve element comprising a lip-shaped valve, a line section adjacent said valve being provided with an elastic widened portion.

6. A system for pumping fluid media comprising: a conduit for receiving the media to be pumped, said conduit including a first section of an elastic material, a second elastic material section which has a cross sectional flow area which is normally constrictvie relative to the cross sectional flow area of said first section, and a third elastic material section including a normally constricted cross sectional flow area like that of said second section; said first section being interposed between said second section and said third section, means for repetitively applying force to said first section to reduce the flow area thereof to pressurize the fluid media and enable the pressurized media to expand the normally constricted flow area of said second and third sections for flow of fluid media from said first section to said second and third sections and through the expanded constricted flow areas of the latter; said constricted flow areas, upon release of such presusre, substantially inhibiting return flow of fluid media to said first section; and means connected with said second and third sections for selectively expanding the constricted flow area of one of said second and third sections to selectively control the direction of fluid media displacement from said first section.

7. A system for pumping fluid media comprising: a conduit for receiving the media to be pumped, said conduit including a first section of elastic material and a second elastic material section which has a cross sectional flow area which is normally constricted relative to the cross sectional flow area of said first section; means for repetitively applying force to said first section to reduce the flow area thereof to pressurized the fluid media and enable the pressurized media to expand the normally constricted flow area of said second section for flow of fluid media from said first section to said second section and through the expanded constricted flow area of the latter; said constricted flow area, upon release of the pressure, substantially inhibiting reverse flow of fluid media to said first section; said means for applying force including driving means operated by a variable electric current; said driving means having an axis of oscillation; and means mounting said driving means for oscillation about said axis of oscillation.

8. A system for pumping fluid media comprising: a condiut for receiving the media to be pumped, said conduit including a first section of elastic material and a second elastic material section which has a cross sectional flow area which is normally constricted relative to the cross sectional flow area of said first section; means for repetitively applying force to said first section to reduce the flow area thereof to pressurize the fluid media and enable the pressurized media to expand the normaly constricted flow area of second section for flow of fluid fluid media from said first section to said second section and through the expanded constricted flow area of the latter; said constricted flow area, upon the release of such pressure, substantially inhibiting return flow of fluid media to said first section; said means for applying force including a driving means operable by a variable electric current; said system, including said driving means, being mounted within a tightly sealed housing; said housing being filled with a pressurizing media; and means operatively associated with said housing for maintainng a selected pressure of said pressurizing media.

References Cited by the Examiner

UNITED STATES PATENTS

| | | | |
|---|---|---|---|
| 342,131 | 5/86 | Perkins et al. | 103—148 |
| 1,893,776 | 1/33 | Hull | 103—148 |
| 1,988,624 | 1/35 | Kipp. | |
| 2,689,530 | 9/54 | Harvey | 103—148 |
| 3,048,121 | 8/62 | Sheesley | 103—148 X |

FOREIGN PATENTS

| | | |
|---|---|---|
| 850,942 | 9/39 | France. |
| 1,157,507 | 12/57 | France. |
| 800,805 | 12/50 | Germany. |

LAURENCE V. EFNER, *Primary Examiner.*

Notice of Adverse Decision in Interference

In Interference No. 95,742 involving Patent No. 3,190,229, E. Turowski, METHOD AND APPARATUS FOR CONVEYING LIQUIDS, final judgment adverse to the patentee was rendered Mar. 26, 1968, as to claims 1, 6 and 7.

[*Official Gazette July 2, 1968.*]